US008223890B1

United States Patent
Su

(10) Patent No.: US 8,223,890 B1
(45) Date of Patent: Jul. 17, 2012

(54) ASYMPTOTICALLY OPTIMAL MODULATION CLASSIFICATION METHOD FOR SOFTWARE DEFINED RADIOS

(75) Inventor: Wei Su, Englishtown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 300 days.

(21) Appl. No.: 12/590,862

(22) Filed: Oct. 30, 2009

(51) Int. Cl.
*H04L 27/22* (2006.01)
*H04L 27/06* (2006.01)
(52) U.S. Cl. .......................... 375/324; 375/340; 375/341
(58) Field of Classification Search .......... 375/259–261, 375/267–269, 271, 273, 279, 316, 320, 323–324, 375/329, 343, 347, 340–341, 377; 329/300, 329/304, 315–316, 318, 345, 347–349, 307; 714/794, 795
See application file for complete search history.

(56) References Cited

U.S. PATENT DOCUMENTS

| | | | | |
|---|---|---|---|---|
| 5,381,450 | A * | 1/1995 | Lane .............................. | 375/340 |
| 7,668,262 | B2 * | 2/2010 | Woo et al. ...................... | 375/343 |
| 7,697,639 | B2 * | 4/2010 | Kim et al. ....................... | 375/329 |
| 2002/0041639 | A1 * | 4/2002 | Krupezevic et al. ........... | 375/324 |
| 2006/0072679 | A1 * | 4/2006 | Chen et al. ...................... | 375/261 |
| 2009/0197626 | A1 * | 8/2009 | Huttunen et al. .............. | 455/522 |
| 2009/0207950 | A1 * | 8/2009 | Tsuruta et al. ................. | 375/343 |
| 2010/0098193 | A1 * | 4/2010 | Liu et al. ......................... | 375/340 |
| 2011/0074500 | A1 * | 3/2011 | Bouillet et al. ................ | 329/347 |

OTHER PUBLICATIONS

Dobre et al., Survey of Automatic Modulation Classification Techniques: Classical Approaches and New Trends, 2007, Communications, IET, vol. 1, Issue: 2, pp. 137-156.*
Freitas et al., Automatic Modulation Classification for Cognitive Radio Systems: Results for the Symbol and Waveform Domains. Sep. 10-11, 2009, Communications, 2009. LATINCOM '09. IEEE Latin-American Conference on, pp. 1-6.*
Su et al., Real-time Modulation Classification Based on Maximum Likelihood, 2008, IEEE Communications Letters, vol. 12, Issue: 11, pp. 801-803.*
Xu et al., Likelihood-Ratio Approaches to Automatic Modulation Classification, 2011, Systems, Man, and Cybernetics, Part C: Applications and Reviews, IEEE Transactions on, vol. 41, Issue: 4, pp. 455-469.*
Su et al., Real-Time Modulation Classification Based on Maximum Likelihood, 2008, Communications Letters, IEEE, vol. 12, Issue : 11, pp. 801-803.*
Umebayashi, Kenta et al, "Blind Estimation of the Modulation Scheme Adapted to Noise Power Based on a Concept of Software Define Radio", Yokohama National University, Yokohama, Japan, May 2000.
Su, Wei et al "Real Time Modulation Classification Based on Maximum Likelihood," IEEE, pp. 1-3, Nov. 2008.
Xu, Jefferson L. et al, "Software Defined Radio Equipped with Rapid Modulation Recognition," IEEE, pp. 1-23.

(Continued)

*Primary Examiner* — Lawrence B Williams
(74) *Attorney, Agent, or Firm* — Michael Zelenka; Stephen J. Harbulak

(57) ABSTRACT

A method for identifying the modulation scheme of a software defined radio in real-time without pilot symbols between transmitters and receivers, includes providing a pre-determined look-up table (LUT) in the software-defined radio wherein the LUT is prepared by pre-calculating discrete likelihood ratio test (DLRT) function values; storing the pre-calculated DLRT values in said LUT; and indexing the pre-calculated DLRT values by addresses.

4 Claims, 5 Drawing Sheets

OTHER PUBLICATIONS

Huang, Chung-Yu, "Likelihood Methods for MPSK Modulation Classification," IEEE Transactions on Communications, vol. 43, No. 2/3/4, pp. 1493-1504, Feb./Mar./Apr. 1995.

Sills, J.A., "Maximum-likelihood Modulation Classification for PSK/QAM," IEEE, pp. 217-220, May 1999.

Umebayashi, Kenta et al,"Blind Adaptive Estimation of Modulation Scheme for Software Defined Radio," IEEE, pp. 43-47, May 2000.

Öner, Mengüç et al, "Air Interface Recognition for a Software Radio System Exploiting Cyclostationarity," Procedings of the 15th IEEE Personal, Indoor and Mobile Radio.

Communications, vol. 3, pp. 1947-1951, Sep. 2004.

* cited by examiner

ASYMPTOTICALLY OPTIMAL MODULATION CLASSIFICATION METHOD FOR SOFTWARE DEFINED RADIOS

GOVERNMENT INTEREST

The invention described herein may be manufactured, used, imported, sold, and licensed by or for the Government of the United States of America without the payment to me of any royalty thereon.

FIELD OF THE INVENTION

The present invention is directed to a likelihood test based modulation classification method used for identifying the modulation schemes of a software-defined radio (SDR) in real-time without a pilot symbol or any hand shaking between the transmitter and the receiver. The invention is also directed to an asymptotically optimal estimation approach using pre-calculated look-up tables for rapid processing.

BACKGROUND OF THE INVENTION

With the revolution of digitizing communications ever closer to the antenna, software-defined radios (SDRs) with programmable modulation schemes and transmission rates have become a practical wireless communication platform. The concept is to exploit the radio transmission environment and choose the best modulation scheme to maximize the channel capacity and minimize the interferences in real time. The general principles of SDRs and modulation classifications or schemes are presented in the following publications which are incorporated herein in their entirety: Y. Huang and A. Polydoros, Likelihood methods for MPSK modulation classification. *IEEE Trans. Commun.*, vol. 43, 1493-1504; J. Sills, Maximum-likelihood modulation classification for PSK/QAM. *Proc. MILCOM '99*, 1999, 57-61; K. Umebayshi et al., "Blind estimation of the modulation scheme adapted to noise power based on a concept of software define radio," in Proc. in European Wireless 2002(EW2002), pp. 829-834 (2002-02); O. Menguc and F. Jondral, "Air interface recognition for a software radio system exploiting cyclostationarity," in Proc. of the 15th IEEE Personal, Indoor and Mobile Radio Communications, Vol. 3, September 2004, pp. 1947-1951. When the signal data transmitted frame by frame, the modulation scheme in each data frame was chosen depending upon the channel SNR. The adaptive modulation scheme maintains the bit error rate (BER) below a certain threshold to ensure the quality of service (QoS) in data transmission. In pilot symbol based adaptive demodulation, a known pilot symbol is used in the transmitted data frame to indicate the modulation scheme for proper demodulation at the receiver. The disadvantage is that the pilot symbol occupies the bandwidth. In order to eliminate the pilot symbol and use the bandwidth efficiently, some research works have been conducted to migrate the military modulation classification techniques to commercial applications in selecting the modulation schemes automatically and blindly without the redundant pilot symbols.

The transmitted radio frequency (RF) signal should be demodulated at the receiver in real-time to ensure the continuous communication. However, the prior art automatic modulation classification methods are developed for signal surveillance purposes which does not intend to demodulate the signal on the fly. Those methods are extremely time consuming and complicated so that a large delay is introduced in computation and data processing. This delay may cause data collisions in the real-time transmission and degrade the QoS. This invention proposes a rapid processing and classification method to solve the time-consuming and computationally intensive problems.

SUMMARY OF THE INVENTION

The present invention is directed to a demodulation device comprising means for preparing a symbol corresponding to a signal; means converting said symbol to an address of a predetermined look-up table (LUT); means for loading the pre-calculated values of the test functions for the likelihood ratio test; and means for producing the estimated modulation scheme in real-time.

In one preferred embodiment, the means for preparing a signal comprises means for preprocessing the signal. Preferably the converting means comprises means for quantizing the symbol and mapping the symbol to a predetermined set of L number of parallel LUTs or number of hypothetical modulation schemes. The converting means can also comprise means for normalizing the signal before quantization and address mapping. The L number of hypothetical modulation schemes can be several of a plurality of modulation schemes including at least PSK4, PSK8, PSK16, QAM8, QAM16, QAM 32, and QAM 64.

In an alternative preferred embodiment, the means for producing the estimated modulation scheme comprises parallel accumulators adapted and configured to calculate the likelihood ratios associated to the L number of hypothetical modulation scheme hypotheses.

In a preferred embodiment, the means for producing the estimated modulation scheme in real-time comprises means for determining the modulation scheme when the likelihood ratio test function is a maximum. The preferred embodiment can also include means for storing the pre-calculated discrete likelihood ratio test (DLRT) values in the LUT without depending on the input data. It can also include means for indexing the pre-calculated values by addresses.

The present invention is also directed to a software-defined radio comprising means for collecting signals and storing data and capable of receiving at least one signal from an unknown transmission source, means for preparing a symbol corresponding to the signal; means converting said symbol to an address of a predetermined look-up table (LUT); means for loading the pre-calculated values of the test functions for the likelihood ratio test; and means for demodulating the data in real-time.

The software-defined radio can further comprise means for data processing. At least one software program can be included in the data processing means for implementing operation of the various means of the software-defined radio. The software-defined radio can include at least one storage medium. The at least one software program can be encoded in the at least one storage medium. The storage medium can also be pre-loaded with the pre-calculated values of the test functions for the discrete likelihood ratio test (DLRT). In a preferred embodiment, the at least one software program can be configured and adapted for determining the estimated modulation scheme in real-time when the likelihood ratio test function is a maximum The present invention is also directed to a method for processing and classifying an unknown modulation scheme in a signal received by a software-defined radio, comprising preparing a symbol corresponding to the signal; converting said symbol to an address of a predetermined look-up table (LUT); loading the pre-calculated values of the test functions for the likelihood ratio test; and demodulating the data in real-time.

In another preferred alternative embodiment of a method of the present invention, preparing a symbol includes preprocessing the signal. Also converting the symbol comprises quantizing the signal and mapping the symbol to a predetermined set of L number of parallel LUTs or number of hypothetical modulation schemes. Converting the symbol can also comprise normalizing the signal before quantization and address mapping. The L number of hypothetical modulation schemes is several of a plurality of modulation schemes including at least PSK4, PSK8, PSK16, QAM8, QAM16, QAM 32, and QAM 64.

In another preferred embodiment of a method of the present invention, producing the estimated modulation scheme comprises providing parallel accumulators adapted and configured to calculate the likelihood ratios associated to the L number of hypothetical modulation scheme hypotheses.

Prefereably, the method further comprises determining the modulation scheme when the likelihood ratio test function is a maximum. In preparing the LUT, the method comprises pre-calculating a discrete likelihood ratio test (DLRT) function without depending on the input data; storing the pre-calculated DLRT values in said LUT; and indexing the pre-calculated DLRT values by addresses.

In an alternative embodiment of the present invention, the method for identifying the modulation scheme of a software defined radio in real-time without pilot symbols between transmitters and receivers, comprises converting an unknown signal symbol to an address of a look-up table; loading the pre-calculated values of the test functions for the likelihood ratio test; and demodulating the data in real-time.

The method for identifying the modulation scheme of a software defined radio in real-time can further comprise providing a means for data processing. At least one software program can be provided in the data processing means for implementing operation of the software-defined radio. The software-defined radio can include at least one storage medium encoded with the at least one software program. The storage medium also can be pre-loaded with the pre-calculated values of the test functions for the discrete likelihood ratio test (DLRT).

In yet another alternative embodiment, the method further comprises configuring and adapting at least one software program for determining the estimated modulation scheme in real-time when the likelihood ratio test function is a maximum. The method can further comprise using the estimated modulation scheme in real-time to choose a demodulator in the software-defined radio for signal demodulation.

BRIEF DESCRIPTION OF THE DRAWINGS

These and other features and advantages of the present invention will become more apparent from the following detailed description in conjunction with the appended drawings in which.

DETAILED DESCRIPTION OF THE INVENTION

Figure 1:
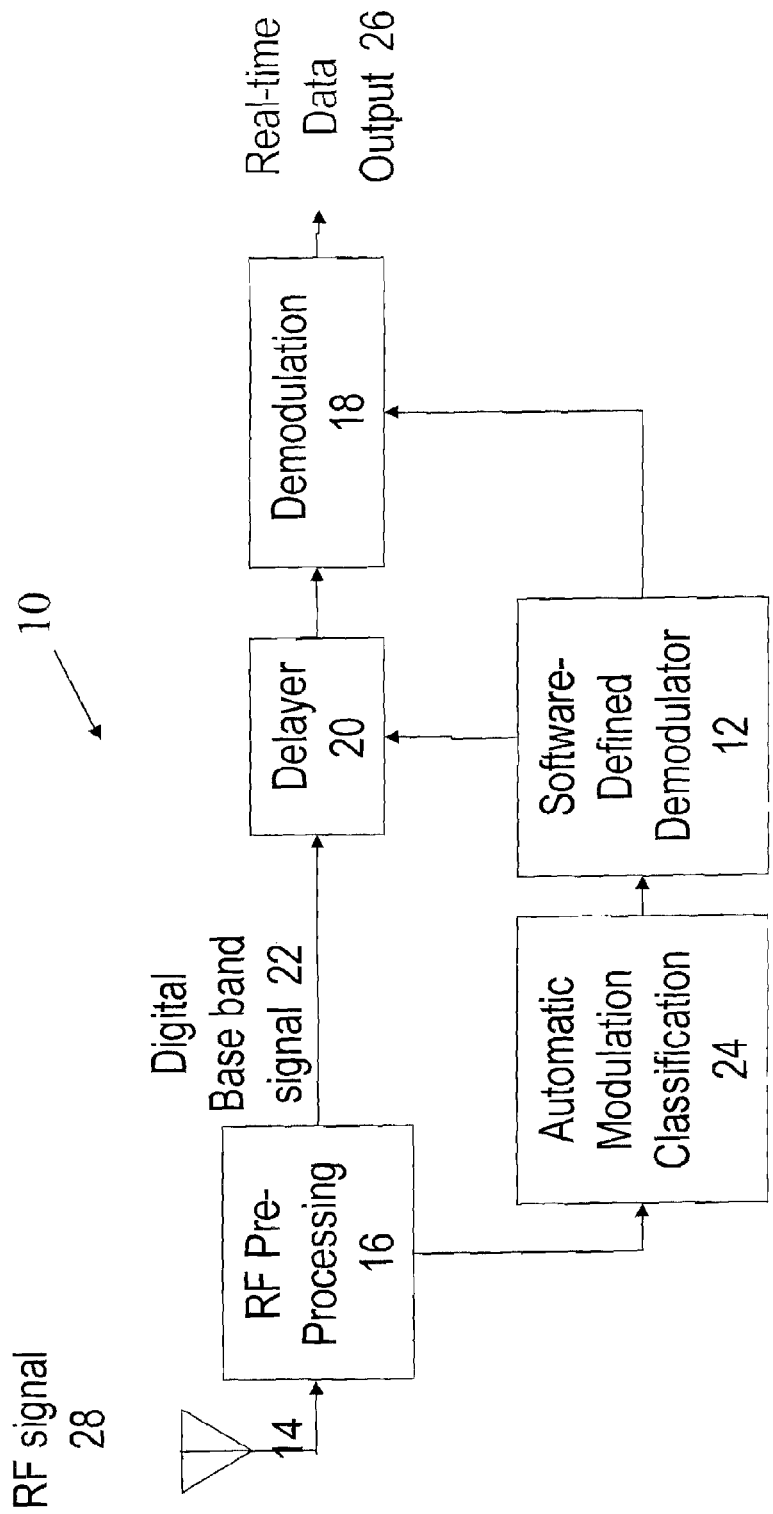
FIG. 1 is a block diagram of a prior art software-defined radio employing an automatic modulation classification as a statistical process in estimating the modulation scheme of an unknown signal based on multiple matching templates, having an automatic modulation estimator embedded into the receiver of the software-defined radio, and wherein the modulation estimator works in parallel with a programmable demodulator in the receiver.

In known SDR systems, the automatic modulation classification can be described as a statistical process in estimating the modulation scheme of an unknown signal based on multiple matching templates. The goal is to identify the modulation scheme of a transmitted signal with a high probability of success within a short observation time. A common practice is to embed an automatic modulation estimator into the receiver of a SDR 10. The modulation estimator works in parallel with a programmable demodulator 12 in the receiver as shown in FIG. 1. A frame of signal data is transmitted in radio frequency (RF) through the air and the modulation scheme of the data frame of the RF signal is determined by the transmitter and is not known at the receiver. The receiver collects the RF signal from an antenna 14 and preprocesses 16 (such as frequency down-conversion, band-pass filtering, analog-to-digital conversion, phase and timing synchronizations, etc.) it to baseband signal for demodulation 18. Since the modulation scheme is not known, the preprocessed signal data frame is stored in a delayer 20 (memory) to wait for the demodulation decision from the automatic modulation classification. At the same time, the preprocessed digital baseband signal 22 is fed to the automatic modulation classification processor 24 and the modulation scheme of the transmitted data frame is classified and the software-defined demodulator 12 will be cued to change the demodulation scheme accordingly. Then, the data frame in the delayer 20 is released for demodulation process 18. If the signal delay is sufficiently small (or the modulation classification processing is sufficiently fast), the real-time data output 26 is achieved at the receiver.

Automatic modulation classification 24 is a critical component in estimating the unknown modulation scheme so that an appropriated demodulator 12 is used to demodulate the signal. Average logarithmic ratio test (ALRT) is a very popular prior art and is an optimal method to automatically classifying linear modulation schemes including various phase-shift keying (PSK) and quadrature amplitude modulation (QAM). The ALRT treats a noisy preprocessed signal symbol, denoted by r(k), as a random variable, this random valuable is compared with $M_i$ number of known values, denoted as $b_j^{(i)}$, j=1, 2, . . . , $M_i$, under the $i^{th}$ hypothesis $H_i$. The errors between the r(k) and $b_j^{(i)}$ are assumed to have Gaussian distributions and the logarithmic likelihood test function is formed using the joint probability distribution functions (PDFs) described by:

$$L(H_i \mid r(k)) = \sum_{k=1}^{K} T^{(i)}(r(k)), \quad (1)$$

where $$T^{(i)}(r(k)) = \log_e \left\{ \frac{1}{2\pi\sigma^2 M_i} \sum_{j=1}^{M_i} \exp\left\{ -\frac{\|r(k) - b_j^{(i)}\|^2}{2\sigma^2} \right\} \right\}, \quad (2)$$

i=1, 2, . . . , L, and r(k) is a complex data sequence of length K, obtained after the matched filtering. σ is the two-sided power spectral density of the additive white Gaussian noise (AWGN) channel, and the complex value $b_j^{(i)}$, j=1, 2, . . . , $M_i$ is the $j^{th}$ reference state of hypothetical modulation scheme. If the computed PDFs matches the hypothetical ones, the likelihood of the test function will be high. Therefore, the decision of modulation classification is made based on the criterion: choose $1 \leq I \leq L$ as the modulation scheme if $L(H_I|r(k))$ is a maximum. In other words, the modulation scheme I is chosen by maximizing likelihood (or minimizing errors) with the winning hypothesis $H_I$. Although the ALRT modulation classifier provides the optimal estimation, it has drawbacks:

1. It is computationally intensive. The statistical estimation usually involves massive additions, multiplies, and exponential/logarithmic calculations.

2. It is time-consuming in calculation. The computation in Equations 1 and 2 are very difficult to be implemented in parallel or be calculated off-line.

This invention, unlike the prior art, converts an unknown signal symbol to an address of the look-up table, loads the pre-calculated values of the test functions for likelihood ratio test, and produces the estimated modulation scheme in real time. The estimated modulation scheme is used to choose the appropriate demodulator in the software-defined radio for signal demodulation. This invention proposes an asymptotically optimal classification method for rapid processing and classification of the unknown modulation schemes. A discrete likelihood ratio test (DLRT) function is proposed such that the values of the DLRT function can be pre-calculated without depending on the input data. These pre-calculated values are stored in a look-up table (LUT) and are indexed by addresses. A preprocessed digital baseband data (a symbol) is quantized and mapped to an address which points to a set of L number of parallel LUTs. The pre-calculated DLRT values are loaded from L LUTs based on the address for likelihood ratio test. Since most of computations are done off-line, and the real-time process are in a parallel structure, there is no time-consuming computation is needed in modulation classification process. The modulation scheme is estimated and fed to demodulation process and an appropriate demodulator is chosen at the SDR for the real-time demodulation of the transmitted signal.

Define and calculate the look-up tables:

(1) L number of hypothetical modulation schemes, such as PSK4, PSK8, PSK16, QAM8, QAM16, QAM 32, and QAM 64, are chosen by assuming the modulation scheme of the transmitted signal fits one of the hypotheses. The constellation point, $b_j^{(i)}$, i=1, 2, ... L, and j=1, 2, ..., $M_i$, of the $i^{th}$ hypothetical modulation scheme is established based on known definition and the constellation points are normalized to unity average power. The expected range of the signal-to-noise ratio is chosen based on the application so that the expected range of the normalized two-sided power spectral density of the additive white Gaussian noise can be calculated.

Figure 2:
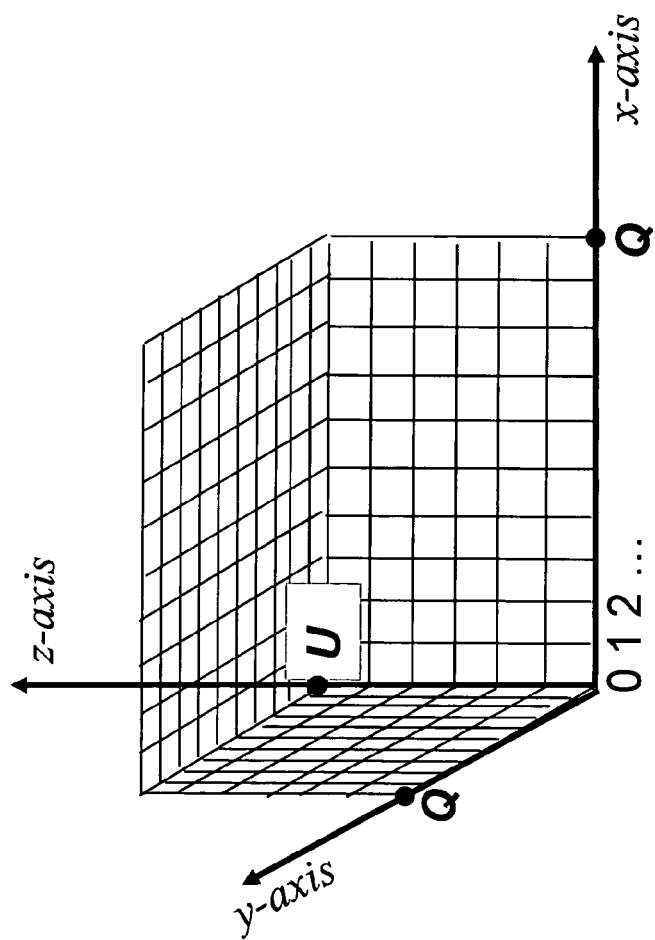
FIG. 2 is a 3D grid map with Q×Q×U cells addressed by the indices p, q, and u.
Figure 3:
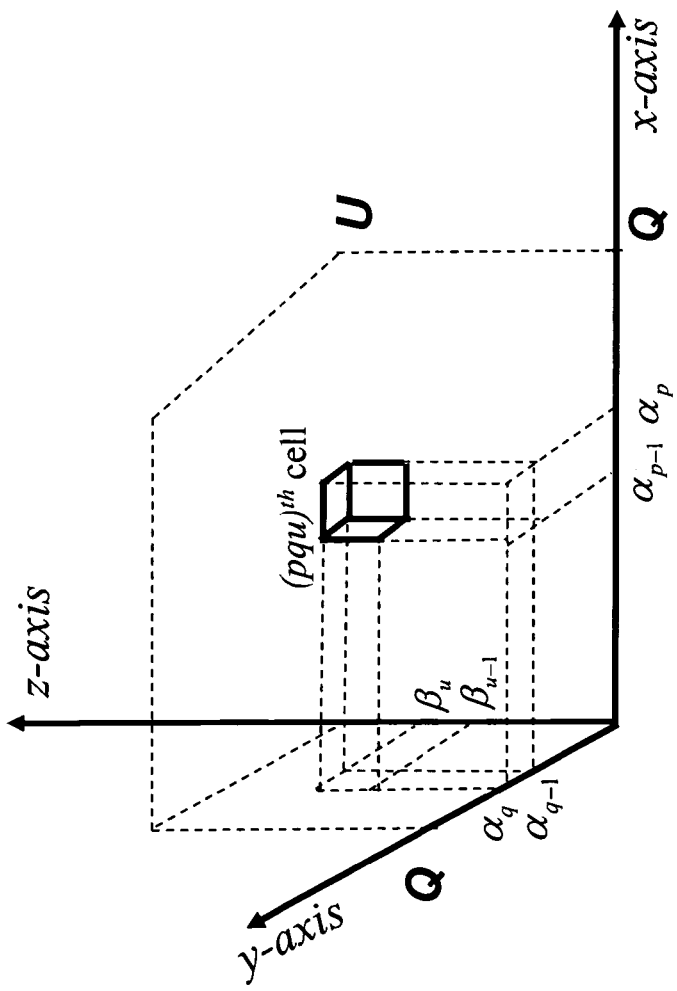
FIG. 3 is a 3D grid map in accordance with the grid map of FIG. 2 and showing the interval bounds of the (pqu)$^{th}$ cell.

(2) A 3D grid with Q×Q×U number of cells is established as shown in FIG. 2. The cell is addressed by indices p=1, 2, ..., Q, q=1, 2, ..., Q, and u=1, 2, ..., U. Therefore, the (pqu)$^{th}$ cell is bounded by interval [$\alpha_p$, $\alpha_{p-1}$) in x-axis, interval [$\alpha_p$, $\alpha_{p-1}$) in y-axis, and interval [$\beta_u$, $\beta_{u-1}$) in z-axis as shown in FIG. 3. The values of Q and U are determined by user based on the resolution requirement and complexity of the hypothetical constellation. The larger the values of Q and U, the more expansive the LUT. The value of $\alpha_n$ is determined such that the expected range of the normalized amplitude of the unknown input and all the normalized hypothetical modulation constellations are bounded by interval [$\alpha_0$, $\alpha_Q$] in both x-axis and y-axis and lies at the center of the x-y coordinate $(\frac{\alpha_Q}{2}, \frac{\alpha_Q}{2})$.

The value of $\beta_u$ is determined such that the expected range of the normalized two-sided power spectral density is bounded by the interval [$\beta_0$, $\beta_U$].

(3) A value of the LUT is calculated by denoting $x_p$ as the center of the $p^{th}$ elements between interval [$\alpha_p$, $\alpha_{p-1}$) in x-axis, $y_q$ as the center of the $q^{th}$ elements between interval [$\alpha_p$, $\alpha_{p-1}$) in y-axis, and $z_u$ as the center of the $u^{th}$ elements between interval [$\beta_u$, $\beta_{u-1}$) in z-axis, that is, $$x_p = \frac{\alpha_p + \alpha_{p-1}}{2}, \; y_q = \frac{\alpha_q + \alpha_{q-1}}{2}, \text{ and } z_u = \frac{\beta_u + \beta_{u-1}}{2},$$

defining $\mu_{pq} = x_p + j y_q$ and $j = \sqrt{-1}$, and calculating the value of the DLRT function of hypothesis Hi as follows $$T_{pqu}^{(i)} = T^{(i)}(\mu_{pq}, z_u) = \log_e \left\{ \frac{1}{2\pi z_u^2 M_i} \sum_{j=1}^{M_i} \exp\left\{ -\frac{\|\mu_{pq} - b_j^{(i)}\|^2}{2 z_u^2} \right\} \right\} \quad (4)$$

Notice that, for the ith hypothesis Hi, the value of $T_{pqu}^{(i)}$ is determined by three indices, p, q, and u of the address cell and depends neither on time index k nor on the value of r(k). Therefore, it can be calculated off-line and stored in the LUT used for real-time process. There are L parallel LUTs which are pointed to or identified by the same address corresponding to L hypothetical modulation constellations.

Map the digital baseband signal symbol to indices of the LUT:

Under the definition of the Q×Q×U grid address structure and LUTs for every hypotheses, the digitized complex valuable r(k) sampled after the matched filtering at the receiver is normalized to the unit average power and quantized by Q×Q grid. The real value of the quantized and normalized r(k) corresponds to an appropriate index p, the imaginary value of the quantized and normalized r(k) corresponds to an appropriate index q, and the estimated value of q is normalized to the average signal amplitude and quantized by U grid. The quantized and normalized σ corresponds to an appropriate index u. Therefore, the inputs r(k) and σ map to the indices p, q, and u of the (pqu)th cell which are used to load the value of, i=1, 2, ..., L.

Calculate the likelihood ratio test function and determine the modulation scheme:

Denote $T_{pqu}^{(i)}(k)$ as the value of $T_{pqu}^{(i)}$ loaded at the instance k, the likelihood test function of the quantized r(k) can be calculated by accumulating all the values of $T_{pqu}^{(i)}$ loaded from the LUT for all instances, that is k=1, 2, ..., K. Mathematically, $$L_a(H_i | r(k)) = \sum_{k=1}^{K} T_{pqu}^{(i)}(k) \quad (5)$$

Therefore, the decision of modulation classification is made based on the criterion: choose i=I, $1 \leq I \leq L$, as the modulation scheme if $L_a(H_I|r(k))$ is a maximum. The likelihood ration function $L_a(H_i|r(k))$ can be calculated using parallel accumulators to speed up the process. The estimated modulation scheme is reported and fed to the demodulation process at the SDR for choosing an appropriate demodulator. The transmitted signal with unknown modulation scheme is demodulated in real-time.

Analysis of asymptotically optimization property

To show the $L_a(H_i|r(k))$ test function is asymptotically optimal, Equation 5 is rearranged to $$L_a(H_i \mid r(k)) = \sum_{p=1}^{Q} \sum_{q=1}^{Q} T_{pqu}^{(i)} D_{pq} \quad (6)$$

where $D_{pq}$, $p=1, 2, \ldots, Q$, $q=1, 2, Q$, $u=1, 2, \ldots, U$ is the number of element of the quantized $r(k)$, for $k=1, 2, \ldots, K$, that falls into the $(pq)$th cell which can be obtained by applying the joint-histogram operation to the quantized $r(k)$. The joint-histogram is constructed from a density table with the intervals shown on the x-y axis and the number of occurrences in each x-y interval represented by the height of a rectangular bin located above the x-y interval.

Equation 6 implies that the likelihood test function of $H_i$ can be approximated by the summation of $Q \times Q$ product terms, each term is the average template of PDF in the $(pq)^{th}$ cell multiples the number of occupancy of $T_{pqu}^{(i)}$ in the $(pq)^{th}$ cell denoted by $D_{pq}$. Since $D_{pq}$ is the joint-histogram of $r(k)$ with $Q \times Q$ bins. Equation 6 acts as the correlation of the joint-histogram of $r(k)$ and the logarithmic joint-PDF of the templates of the $i^{th}$ hypothetical modulation scheme. If the resolution of the grid is sufficiently small, the histogram quantization periods approaches the sampling periods, the joint-histogram approaches the joint-PDF, and the results of the histogram test approach the results of the ALRT, that is $$L_a(H_i|r(k)) \to L(H_i|r(k)) \quad (7)$$

showing that the DLRT is a special case of the ALRT, and is an asymptotically optimal estimation.

Implementation

The rapid automatic modulation classification method can be implemented either in software or hardware. The software implementation can be developed by using Equation 6 by first calculating the joint histogram $D_{pq}$ of the signal with unknown modulation scheme and then correlating it with L known templates, denoted by $T_{pqu}^{(i)}$, for maximizing the likelihood function $L_a(H_i|r(k))$. The modulation scheme is determined if the associated likelihood ratio is a maximum.

Figure 4:
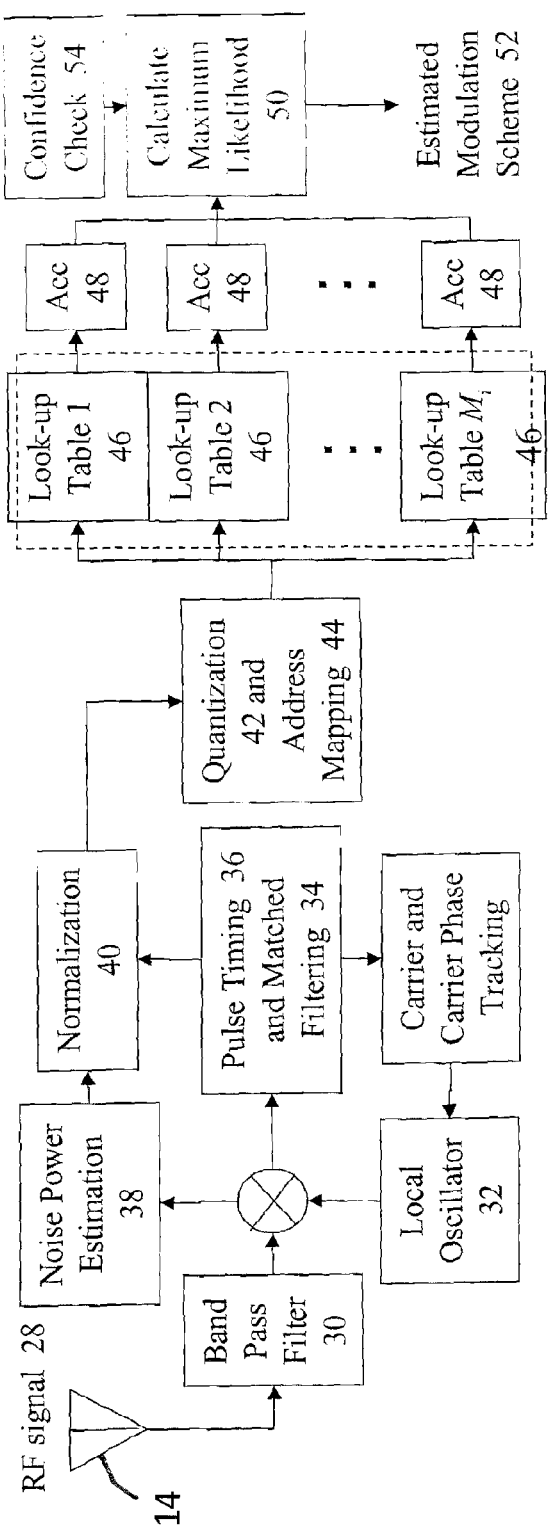
FIG. 4 is a conceptual block diagram of an exemplary hardware implementation of the rapid automatic modulation classification process according to one embodiment of the present invention without showing the demodulation process.

The hardware implementation of the rapid automatic modulation classification process is described by a conceptual block diagram in FIG. 4. The RF signal 28 is collected from an antenna 14, pass through a preprocessing procedure. The preprocessing can be implemented using various existing methods which may includes band pass filters 30, frequency down-conversion with coherent local oscillator 32, a matched filter 34, and the pulse timing 36. The noise power is estimated 38. Both the signal symbol from the matched filter 34 and estimated noise 38 are normalized 40 and quantized 42 by the Q×Q×U grid scale to obtain indices p, q, and u. Those indices provide an address 44 used to load the values of the pre-calculated likelihood ratio functions from L number of parallel LUTs 46. The values from LUTs 46 are sent to parallel accumulators 48 (Acc) to calculate the likelihood ratios 50 associated to the L hypotheses. A decision 52 is made after the maximum likelihood ratio test. Confidence check 54 is conducted. If the confidence level is below the given threshold (determined by user), the estimation is failed. Otherwise, the estimated modulation scheme is reported and fed to the demodulation process after choosing an appropriate demodulator. The demodulation process is not shown in FIG. 4.

Figure 5:
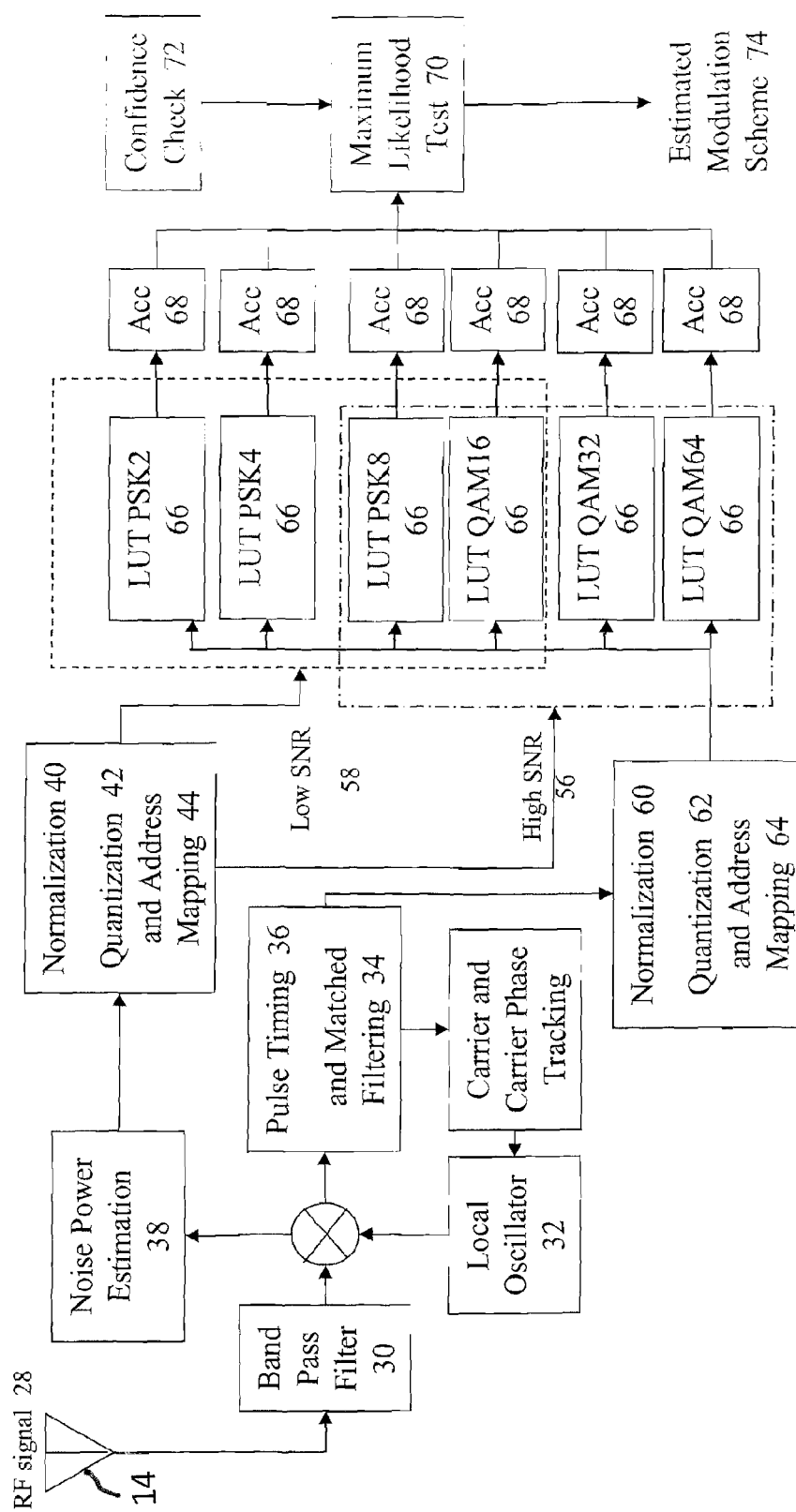
FIG. 5 demonstrates an exemplary embodiment according to the present invention with hypotheses of PSK2, PSK4, PSK8, QAM16, QAM32, and QAM64 without showing the demodulation process.

If dimension of the hypothesis set is large, overlapped subsets are recommended to group the hypothetical modulation schemes requires the similar bit-error rate in order to achieve the better performance. FIG. 5 demonstrates an example with hypotheses of PSK2, PSK4, PSK8, QAM16, QAM32, and QAM64. The RF signal 28 is collected from an antenna 14, pass through a preprocessing procedure as described in the last example in FIG. 4. A threshold is introduced to separate SNR to 'high' 56 and 'low' 58. Both the signal symbol from the matched filter 34 and estimated noise power 38 are normalized 40, 60 and quantized 42, 62 by Q×Q×U grid scale to obtain the indices p, q, and u. Those indices give an address 44, 64 used to load the values of the pre-calculated likelihood ratio functions from L parallel LUTs 66. With the high SNR 56, the values from LUTs 66 of PSK8, QAM16, QAM32, and QAM64 hypotheses are loaded. Or with the low SNR 58, the values from LUTs 66 of PSK2, PSK4, PSK8, and QAM16 hypotheses are loaded. It is remarkable that the hypotheses of PSK8 and QAM16 is overlapped to both high 56 and low SNR 58 in order to provide a buffer area between two groups to improve the classification result. The values of LUTs 66 are sent to L parallel accumulators 68 (Acc) to calculated the likelihood ratios associated to L hypotheses. A decision is made after the maximum likelihood test 70. Confidence check 72 is conducted. If the confidence level is below the given threshold (determined by user), the estimation is failed. Otherwise, the estimated modulation scheme 74 is reported and fed to demodulation process 18 after choosing an appropriate demodulator 12. The demodulation process is not shown in FIG. 5.

The overlapped subsets concept relaxed the crowdedness of the hypothetical set, reduced the computational complexity and increase the calculation speed by eliminating the unnecessary hypothesis, and increased the estimation reliability by large the distance between modulation features. More than two overlap sets may be used if needed.

The automatic modulation classification method of the present invention is also discussed in "Real-time Modulation Classification Based on Maximum Likelihood," by Wei Su, Jefferson L. Xu and Mengchu Zhou. This publication was presented to the IEEE in about November 2008 and is incorporated herein in its entirety. This title was published in Communications Letters with publication year 2008, pages 801-803. Further discussion of software-defined radio and modulation recognition is presented in "Software Defined Radio Equipped with Rapid Modulation Recognition" by Jefferson L. Xu, Wei Su, *Senior Member, IEEE* and Mengchu Zhou, *Fellow, IEEE*, which is also incorporated herein in its entirety. The latter publication was also presented to the IEEE in about October 2009. This title has a date of publication of 2 Feb. 2010 in IEEE Transactions on Vehicular Technology.

CONCLUSION

The transmitted signal is sent frame by frame (a block). The modulation scheme in every frame is determined by the transmitter and may be different at each frame. The modulation scheme in the received data frame is not known at the receiver in non-cooperative SDR and it needs to be identified in real time. The automatic modulation scheme is built into the software-defined radio to classify the modulation scheme so that the demodulator in the SDR is cued to choose an appropriate demodulator. Hence, the signal is demodulated in real time. The invention proposes a rapid processing automatic modulation classification process with asymptotically optimal estimation performance to overcome the computational-extensive and time-consuming processing issues in the prior art.

This invention has commercial applications in developing the next generation software-defined radios with automatic modulation scheme classification capability, and has military application in developing faster signal identification systems.

The preferred embodiments of the present invention described above are not intended to limit the applicability of the present invention. Rather, a person skilled in the art would appreciate that various modifications of the arrangements and types of components and steps described would fall within the scope and spirit of the claimed invention. Accordingly, all expedient modifications readily attainable by one of ordinary skill in the art from the disclosure set forth herein, or by routine experimentation therefrom, are deemed to be within the spirit and scope of the invention as defined by the appended claims.

What I claim is:

1. A method for processing and classifying an unknown modulation scheme used in a signal received by a software-defined radio, comprising:

providing a predetermined look-up table (LUT) in the software-defined radio wherein the LUT is prepared by:
pre-calculating discrete likelihood ratio test (DLRT) function values;
storing the pre-calculated DLRT values in said LUT; and
indexing the pre-calculated DLRT values by addresses;
the method further comprising:
preparing a symbol corresponding to the signal;
converting said symbol to an address of the predetermined look-up table (LUT);
loading the pre-calculated DLRT values of the test functions for the likelihood ratio test; and
classifying the unknown modulation scheme in real-time which includes calculating a likelihood ratio test function, $L_a(H_i|r(k))$.

2. The method of claim 1 wherein preparing a symbol comprises preprocessing the signal.

3. The method of claim 1 wherein converting the symbol comprises normalizing the signal.

4. The method of claim 1 further comprising determining the modulation scheme when the likelihood ratio test function, $L_a(H_i|r(k))$, is a maximum.

* * * * *